(12) United States Patent
Liu et al.

(10) Patent No.: US 11,533,651 B2
(45) Date of Patent: Dec. 20, 2022

(54) TRANSMISSION CONTROL METHOD AND DEVICE

(71) Applicant: ZTE Corporation, Shenzhen (CN)

(72) Inventors: Zhuang Liu, Shenzhen (CN); Yin Gao, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 93 days.

(21) Appl. No.: 17/042,482

(22) PCT Filed: Apr. 8, 2019

(86) PCT No.: PCT/CN2019/081677
§ 371 (c)(1),
(2) Date: Sep. 28, 2020

(87) PCT Pub. No.: WO2019/196765
PCT Pub. Date: Oct. 17, 2019

(65) Prior Publication Data
US 2021/0022031 A1    Jan. 21, 2021

(30) Foreign Application Priority Data
Apr. 12, 2018 (CN) .......................... 201810326452.7

(51) Int. Cl.
*H04W 28/02* (2009.01)
*H04W 24/08* (2009.01)
*H04W 24/10* (2009.01)

(52) U.S. Cl.
CPC ....... *H04W 28/0236* (2013.01); *H04W 24/08* (2013.01); *H04W 24/10* (2013.01)

(58) Field of Classification Search
CPC ......... H04W 28/0236; H04W 28/0252; H04W 28/0268; H04W 28/10; H04W 24/08;
(Continued)

(56) References Cited

U.S. PATENT DOCUMENTS

2019/0059027 A1*  2/2019  Yang ................. H04W 36/0083
2019/0069333 A1*  2/2019  Kim ...................... H04W 76/15
(Continued)

FOREIGN PATENT DOCUMENTS

CN    106162730 A    11/2016
CN    106912117 A    6/2017
(Continued)

OTHER PUBLICATIONS

Huawei, "pCR to 38.460 on centralized retransmission for CP-UP seperation", 3GPP TSG-RAN3 Meeting #99bis R3-182136, Apr. 6, 2018, p. 2.
(Continued)

*Primary Examiner* — Hassan Kizou
*Assistant Examiner* — Hector Reyes
(74) *Attorney, Agent, or Firm* — Cantor Colburn LLP (57) ABSTRACT

Provided are a transmission control method and device. The method includes that: a Control Plane (CP) network element receives a data transmission feedback message and/or a bearer management message sent by a User Plane (UP) network element, where the bearer management message is determined by the UP network element according to data transmission quality between the UP network element and a Distributed Unit (DU), and the data transmission feedback message is configured to indicate data transmission states of the UP network element and the DU; and a bearer of the UP network element is managed according to the data transmission feedback message and/or the bearer management message.

16 Claims, 5 Drawing Sheets

(58) Field of Classification Search
CPC ..... H04W 24/10; H04W 76/20; H04W 76/34; H04W 88/085
See application file for complete search history.

(56) References Cited

U.S. PATENT DOCUMENTS

| | | | |
|---|---|---|---|
| 2019/0075552 A1* | 3/2019 | Yu | H04W 76/10 |
| 2019/0166526 A1* | 5/2019 | Xu | H04W 92/20 |
| 2020/0169913 A1* | 5/2020 | Byun | H04W 28/02 |
| 2021/0014722 A1* | 1/2021 | Han | H04W 28/0268 |
| 2021/0014737 A1* | 1/2021 | Yang | H04W 76/11 |
| 2021/0168637 A1* | 6/2021 | Han | H04L 43/0858 |

FOREIGN PATENT DOCUMENTS

| | | |
|---|---|---|
| CN | 107371155 A | 11/2017 |
| WO | 2015104548 A1 | 7/2015 |
| WO | 2018000644 A1 | 1/2018 |
| WO | 2018009340 A1 | 1/2018 |

OTHER PUBLICATIONS

International Search Report for corresponding application PCT/CN2019/081677 filed Apr. 8, 2019; dated Jun. 27, 2019.
NEC "Baseline CR for June version of TS 38.401 covering agreements of RAN3#99 on", 3GPP TSG-RAN3#99 R3-181577, Mar. 2, 2018.
NEC. "Baseline CR for June version of TS 38.401 covering agreements of RAN3 #99 on", 3GPP TSG-RAN 3#99bis R3-181833, Apr. 7, 2018.
ZTE Corporation, et al., "Discussion on the Stage 2 Architecture of NN-DC", 3GPP TSG RAN WG2 Meeting #101 R2-1802398, Mar. 2, 2018.
Ericsson, "PCR 28.552 Add UC for UL and DL packet loss and UL packet loss measurement", 3GPP TSG SA WG5 (Telecom Management) Meeting #118, Apr. 9-13, 2018, Beijing China, S5-182103.
European Search Report for corresponding application EP19784810; Report dated Apr. 12, 2021.
Nokia, "Evaluation of CP/UP Separation", 3GPP TSG RAN WG3 AdHoc NR, Qingdao China Jun. 27-29, 2017, R3-172308.
ZTE, "Discussion on CU DU ID and NCGI", 3GPP TSG RAN WG3 NR Ad Hoc, Qingdao China Jun. 27-29, 2017, R3-172417.
ZTE, "Update on TR 38.806 V0.2.0", 3GPP TSG RAN WG3 Meeting #98, Reno Nevada Nov. 27, 2017, R3-174401.

\* cited by examiner

TRANSMISSION CONTROL METHOD AND DEVICE

CROSS-REFERENCE TO RELATED APPLICATIONS

The present application claims priority to Chinese Patent Application No. 20181032452.7, filed to the National Intellectual Property Administration, PRC on Apr. 12, 2018, the disclosure of which is hereby incorporated by reference in its entirety.

TECHNICAL FIELD

The present disclosure relates to the field of communications, and in particular to a transmission control method and device.

BACKGROUND

Figure 1:
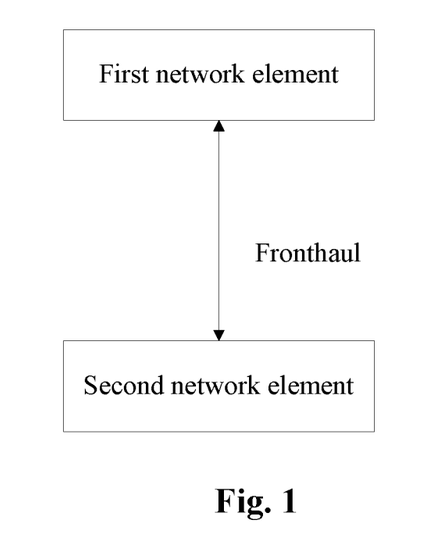
FIG. 1 is a schematic diagram illustrating that a first network element and a second network element transmit through an ideal and/or nonideal fronthaul network according to the relevant art.

In the relevant art, it is necessary to redefine a division manner of a fronthaul network interface in New Radio (NR). For the division manner of the fronthaul interface, several aspects such as a transmission capacity, a transmission delay and convenient deployment are required to be considered comprehensively. For example: in view of nonideal fronthaul transmission, a network function insensitive to the delay is placed in a first network element (like a Centralized Unit (CU)), and a network function sensitive to the delay is placed in a second network element (like a Distributed Unit (DU)). FIG. 1 is a schematic diagram illustrating that a first network element and a second network element transmit through an ideal and/or nonideal fronthaul network according to the relevant art. Here, the fronthaul may denote the fronthaul transmission.

Concerning physical distributions of 5th Generation (5G) user services and unbalanced user services having different Quality of Service (QOS) requirements, requirements on networking deployment and data transmission performance of a 5G network are different; and these different types of data services typically coexist and are interlaced, or are in a hot outbreak in local regions, such that various 5G scenarios cannot be supported efficiently by a relatively closed network architecture at present. Hence, on the basis of dividing the first network element and the second network element, and in combination with comprehensive consideration from multiple perspectives such as the transmission delay, load balance, interoperability of a multi-vendor device and deployment cost, there is a further need to segment a Control Plane (CU-CP) and a User Plane (CU-UP) in the first network element physically (note: both the CU-CP and the CU-UP were logically segmented in a functional set in the past but are still integrated into a single network element physically), such that the CU-CP and the CU-UP may be deployed at different geographical positions, and may be configured independently, extended in resource and upgraded in function, and thus may meet the requirements of various 5G services more flexibly and efficiently.

Figure 2:
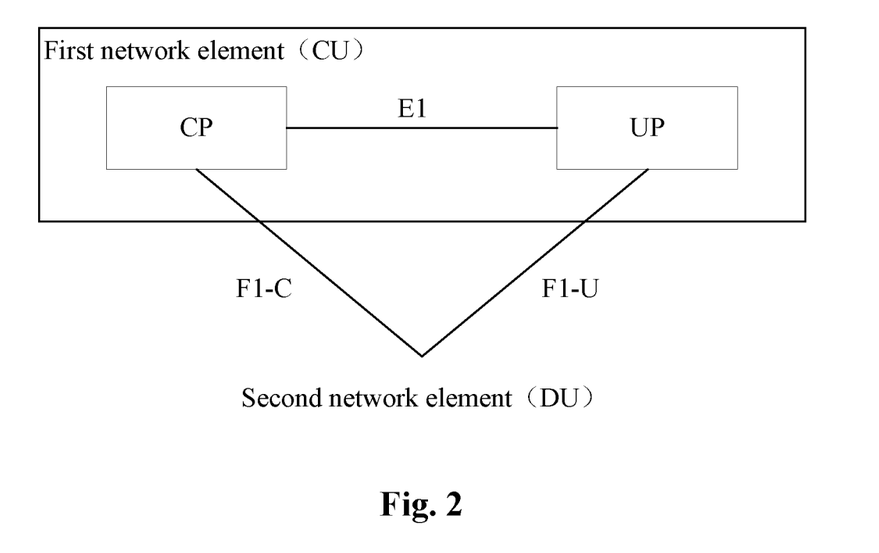
FIG. 2 is a schematic diagram illustrating a connection with a second network element after a CU is separated according to the relevant art.

FIG. 2 is a schematic diagram illustrating a connection with a second network element after a CU is separated according to the relevant art. As shown in FIG. 2, after the CU is separated into independent network element entities, namely the CU-CP and the CU-UP, the logic interface between the CU-CP/CU-UP network element entities is referred to as an E1 interface, the logic interface between the CU-UP and the DU is referred to as an F1-U interface, and the logic interface between the CU-CP and the DU is referred to as an F1-C interface. The DU can only feed UP data transmission and flow control states back to the CU-UP through the F1-U interface between the DU and the CU-UP. The CU-CP now cannot obtain a transmission state and a flow control state of a wireless data bearer on the DU. As a consequence, there is a need to research a new method, such that in a case where the CU-CP and the CU-UP are separated, the CU-CP may obtain the data transmission and flow control states of the wireless data bearer on the DU.

Concerning the problem that after the UP and the CP are separated, the CP network element cannot obtain the data transmission and flow control states of the wireless data bearer on the DU in the relevant art, an effective solution hasn't been provided till now.

SUMMARY

Embodiments of the present disclosure provide a transmission control method and device, to at least solve the problem that after a UP and a CP are separated, a CP network element cannot obtain data transmission and flow control states of a wireless data bearer on a DU in the relevant art.

According to another embodiment of the present disclosure, a transmission control method is further provided, which may include that: a CP network element receives a data transmission feedback message and/or a bearer management message sent by a UP network element, the bearer management message being determined by the UP network element according to data transmission quality between the UP network element and a DU, and the data transmission feedback message being configured to indicate data transmission states of the UP network element and the DU; and a bearer of the UP network element is managed according to the data transmission feedback message and/or the bearer management message.

According to another embodiment of the present disclosure, a transmission control method is further provided, which may include that: a UP network element sends a data transmission feedback message and/or a bearer management message to a CP network element, where the bearer management message is determined by the UP network element according to data transmission quality of transmission data between the UP network element and a DU, and the data transmission feedback message is configured to indicate a data transmission state of the transmission data between the UP network element and the DU; operation information fed back by the CP network element according to the data transmission feedback message and/or the bearer management message is received; and a data bearer between the UP network element and the DU is controlled according to the operation information.

According to another embodiment of the present disclosure, a transmission control device is further provided, which may include: a first receiving module, configured to receive a data transmission feedback message and/or a bearer management message sent by a UP network element, where the bearer management message is determined by the UP network element according to data transmission quality between the UP network element and a DU, and the data transmission feedback message is configured to indicate data transmission states of the UP network element and the DU; and a first management module, configured to manage a bearer of the UP network element according to the data transmission feedback message and/or the bearer management message.

According to another embodiment of the present disclosure, a transmission control device is further provided, which may include: a first sending module, configured to send a data transmission feedback message and/or a bearer management message to a CP network element, where the bearer management message is determined by a UP network element according to data transmission quality of transmission data between the UP network element and a DU, and the data transmission feedback message is configured to indicate a data transmission state of the transmission data between the UP network element and the DU; a second receiving module, configured to receive operation information fed back by the CP network element according to the data transmission feedback message and/or the bearer management message; and a first control module, configured to control a data bearer between the UP network element and the DU according to the operation information.

According to still another embodiment of the present disclosure, a storage medium is further provided; the storage medium stores a computer program; and the computer program is configured to execute, when running, the steps of any of the above-mentioned method embodiments.

According to still another embodiment of the present disclosure, an electronic device is further provided, which includes a memory and a processor; the memory stores a computer program; and the processor is configured to run the computer program to execute the steps of any of the above-mentioned method embodiments.

By means of the present disclosure, the CP network element receives the data transmission feedback message and/or the bearer management message sent by the UP network element, where the bearer management message is determined by the UP network element according to the data transmission quality between the UP network element and the DU, and the data transmission feedback message is configured to indicate the data transmission states of the UP network element and the DU; and the bearer of the UP network element is managed according to the data transmission feedback message and/or the bearer management message. By using the above solution, the problem that after a UP and a CP are separated, the CP network element cannot obtain data transmission and flow control states of the wireless data bearer on the DU in the relevant art is solved, and the CP network element obtains the data transmission and flow control states, thereby further controlling the UP network element.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It is to be noted that terms such as "first" and "second" in the specification, claims and accompanying drawings of the present disclosure are only used to distinguish similar objects, rather than to describe a special order or a precedence order.

Embodiment 1

An embodiment of the present disclosure provides a mobile communication network (including but not limited to a 5G mobile communication network). A network architecture of the network may include a network side device (such as a base station) and a terminal. The embodiment provides an information transmission method capable of running on the network architecture. It is to be noted that an operation environment of the information transmission method provided in the embodiment of the present disclosure is not limited to the above network architecture.

In the present disclosure, the CP network element may be a CP network element device, the UP network element may be a UP network element device, the CU may be a hardware device, and the DU may be a hardware device.

Figure 3:
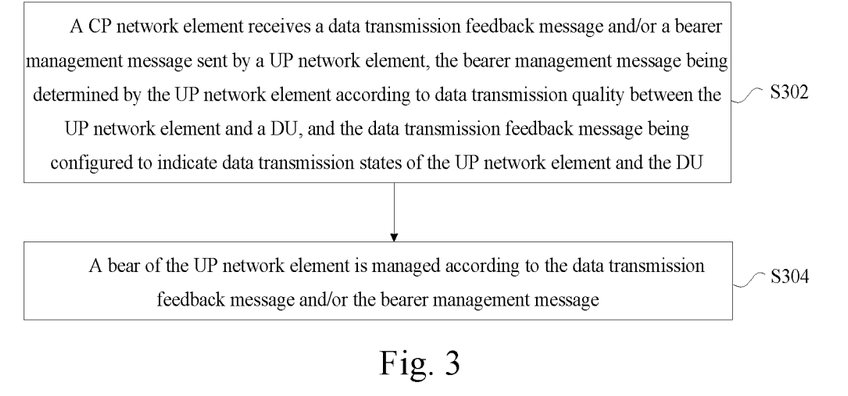
FIG. 3 is a flowchart of a transmission control method according to an embodiment of the present disclosure.

An embodiment provides a transmission control method. FIG. 3 is a flowchart of a transmission control method according to the embodiment of the present disclosure. As shown in FIG. 3, the flow includes the following steps.

At S302, a CP network element receives a data transmission feedback message and/or a bearer management message sent by a UP network element, Here, the bearer management message is determined by the UP network element according to data transmission quality between the UP network element and a DU, and the data transmission feedback message is configured to indicate data transmission states of the UP network element and the DU.

At S304, a bearer of the UP network element is managed according to the data transmission feedback message and/or the bearer management message.**

By means of the above steps, the CP network element receives the data transmission feedback message and/or the bearer management message sent by the UP network element; and the bearer of the UP network element is managed according to the data transmission feedback message and/or the bearer management message. By using the above solution, the problem that after a UP and a CP are separated, the CP network element cannot obtain data transmission and flow control states of the wireless data bearer on the DU in the relevant art is solved, and the CP network element obtains the data transmission and flow control states, thereby further controlling the UP network element.

Optionally, execution sequences of step S302 and step S304 may be interchangeable, i.e., step S304 may be executed first, and then step S302 is executed.

Optionally, before the CP network element receives the data transmission feedback message and/or the bearer management message sent by the UP network element, the CP network element sends measurement control information for indicating the UP network element of measuring the data transmission quality. It is to be noted that the CP network element may unnecessarily send the measurement control information to the UP network element, thereby triggering the UP network element to measure the data transmission quality.

Optionally, the measurement control information includes at least one of the followings: first measurement control information, configured to measure transmission quality of all service data for the DU; and second measurement control information, configured to measure transmission quality of service data of one or more terminals for a bearer of the UP network element. It is to be noted that the all service data may include uplink service data, and downlink service data.

Optionally, a manner that the CP network element sends the measurement control information includes one of the followings: the CP network element carries the measurement control information in a message in an E1 interface setup process. It is to be noted that the CP network element may carry the measurement control information in any message used in the E1 interface setup process. For example, the CP network element carries the measurement control information in an E1 interface setup request message, and carries the measurement control information in an E1 interface setup response message but is not limited thereto. The CP network element carries the measurement control information in a message in a bearer setup or bearer modification process. It is to be noted that, same as the above embodiment, the CP network element may carry the measurement control information in any message in the bearer setup process, or the bearer modification process. For example, the CP network element may carry the measurement control information in a bearer setup request message, may carry the measurement control information in a bearer setup response message, and may carry the measurement control information in a bearer modification message but is not limited thereto. The CP network element sends an independent measurement control information message to the UP network element.

Optionally, the measurement control information includes at least one of the followings: Identifier (ID) information of a CU-CP; ID information of a target CU-UP, which may be ID or Internet Protocol (IP) address information of the CU UP; indication information for a bearer flow control information reporting manner of the target CU-UP, the bearer flow control information reporting manner including: periodically reporting bearer flow control information, reporting the bearer flow control information in an event trigger manner, and reporting the bearer flow control information upon the reception of the indication information; ID information of one or more User Equipments (UEs); and ID information of one or more bearers, which may be Resource Block (RB) ID information.

Optionally, the measurement control information includes at least one of the following indication information: indication information for indicating whether the UP network element measures or reports bearer link quality information, where the bearer link quality information is link quality outage (fast fading of link quality) of one or more bearers, and link quality resume information (restoration of the link quality); indication information for indicating a link quality threshold for triggering bearer release or bearer modification, where the link quality threshold includes one of the followings: a frequency for occurring outage, or a maximum time interval within which resume is not received; indication information for indicating whether to measure or report a packet loss condition of the bearer on a transmission interface, where the packet loss condition includes packet loss conditions of one or more bearers on an F1-U interface; indication information for indicating an F1-U interface packet loss threshold for executing one of the following operations: bearer release trigger, the bearer modification, and F1 interface re-setup, and the packet loss threshold including the average maximum number of lost packets within a period of time; indication information for indicating whether to measure or report an expected data condition of the bearer and an expected data condition of a user, where the expected data condition includes a data buffer size expected by one or more bearers set up on the DU, or a data buffer size expected by one or more UEs connected to the DU; indication information for indicating an expected data threshold for triggering the bearer release or modification, where the expected data threshold includes a maximum data volume threshold that can be provided by the UP for the bearer; indication information for indicating whether to measure or report a data condition transmitted successfully by the bearer, where the successfully transmitted data condition includes a Packet Data Convergence Protocol (PDCP) Protocol Data Unit (PDU) Serial Number (SN) successfully and continuously transmitted to a terminal at maximum by one or more bearers, or a PDCP PDU SN successfully sent to a bottom layer at maximum by one or more bearers; indication information for indicating whether to measure or report a data transmission delay condition of the bearer, where the data transmission delay includes at least one of the followings: a data transmission delay of a CU-UP side, a data transmission delay of a DU side, and a transmission delay of the F1-U interface; indication information for indicating a data transmission delay threshold for triggering the bearer release or the bearer modification, where the data transmission delay threshold includes: the data transmission delay of the CU-UP side exceeds a specific threshold, or the data transmission delay of the DU side exceeds a specific threshold, or the transmission delay of the F1-U interface exceeds a specific threshold; indication information for indicating whether to measure or report the number of retransmission times of a Radio Link Control (RLC); indication information for indicating an RLC maximum retransmission number-of-times threshold for triggering the bearer release or the bearer modification; indication information for indicating whether to measure or report the average number of retransmission times about a Hybrid Automatic Repeat Request (HARQ); indication information for indicating the maximum number of HARQ retransmission times for triggering the bearer release or modification; indication information for indicating whether to measure or report a Block Error Ratio (BLER) or a Bit Error Rate (BER) of data transmission; indication information for indicating a maximum BLER or a maximum BER for triggering the bearer release or the bearer modification; indication information for indicating whether to measure or report a throughput rate of data transmission between the UP network element and the DU; and indication information for indicating a throughput rate threshold for triggering the bearer release or modification, where the throughput rate threshold is configured to indicate throughput rates of one or more services of the UP cannot reach the threshold.

Optionally, the measurement control message may further include a measurement interval and/or a filter parameter corresponding to the measurement of the above any item.

Optionally, the operation that the CP network element receives the data transmission feedback message sent by the UP network element, and performs the bearer management operation according to the data transmission feedback message includes one of the followings: in a case where the CP network element determines, according to the data transmission feedback message, that one or more bearers on the UP network element need to migrate to other UP network elements, the CP network element sends a bearer release message or a bearer modification message to the UP network element to indicate that the UP network element is to migrate one or more bearer services to other UP network elements, and it is to be noted that the bearer service may be a service running on the bearer; in a case where the CP network element determines, according to the data transmission feedback message, to release one or more bearers on the UP network element, the CP network element sends a bearer release message or a bearer modification message to the UP network element to indicate that the UP network element is to release one or more service services; and in a case where the CP network element determines, according to the data transmission feedback message, that an F1 interface between the UP network element and the DU needs to be re-set up, the CP network element indicates the UP network element of re-setting up the F1 interface.

Optionally, after the CP network element receives the data transmission feedback message sent by the UP network element, the CP network element performs a Key Performance Indicator (KPI) statistic and/or an alarm operation according to the data transmission feedback message.

According to another embodiment of the present disclosure, a transmission control method is further provided, which may include the following steps: step 1, a UP network element sends a data transmission feedback message and/or a bearer management message to a CP network element, where the bearer management message is determined by the UP network element according to data transmission quality of transmission data between the UP network element and a DU, and the data transmission feedback message is configured to indicate a data transmission state of the transmission data between the UP network element and the DU; step 2, operation information fed back by the CP network element according to the data transmission feedback message and/or the bearer management message is received; and step 3, a data bearer between the UP network element and the DU is controlled according to the operation information.

Optionally, before the UP network element sends the data transmission feedback message and/or the bearer management message to the CP network element, measurement control information sent by the CP network element for indicating the UP network element of measuring the data transmission quality is received.

Optionally, after the measurement control information sent by the CP network element for indicating the UP network element of measuring the data transmission quality is received, the UP network element performs at least one of the following measurement operations: measurement on link quality, which may be a frequency occurring outage, or a maximum time interval within which resume is not received; measurement on a packet loss condition on an F1-U transmission interface, where the packet loss condition is packet loss conditions of one or more bearers on an F1-U interface; measurement on expected data condition buffer size of the bearer and an expected data condition buffer size of a user; measurement on a successfully transmitted data condition; measurement on a data transmission delay; measurement on the number of retransmission times of an RLC; measurement on the number of times about an HARQ; measurement on a BLER or a BER of data transmission; and measurement on a throughput rate of the data transmission.

Optionally, after the measurement control information sent by the CP network element for indicating the UP network element of measuring the data transmission quality is received, the UP network element measures the data transmission quality according to the measurement control message, and sends a bearer management message to the CP network element according to a measurement result, where the bearer management message includes a cause value.

Optionally, after the UP network element measures the data transmission quality according to the measurement control message, the method further includes at least one of the followings: in a case where the UP network element determines, according to the measurement result, that one or more bearers on the UP network element need to migrate to other UP network elements, the UP network element sends a bearer management message for requesting bearer release or bearer modification to the CP network element; and in a case where the UP network element determines, according to the measurement result, that one or more bearers on the UP network element need to be released, the UP network element sends the bearer management message for requesting the bearer release or the bearer modification to the CP network element.

Optionally, the data transmission feedback message includes at least one of the followings: ID information of a CU-CP, which may be ID or IP address information of the CU-CP; ID information of a target CU-CP, which may be ID or IP address information of the CU-CP; ID information of one or more UEs; ID information of one or more bearers, which may be RB ID information; bearer link quality information, which may be a frequency occurring outage, or a maximum time interval with which resume is not received, or an indication for occurrence of outage, or a link quality resume indication; a packet loss condition of the bearer on a transmission interface, which may be packet loss conditions of one or more bearers on an F1-U interface, or an indication that the packet loss exceeds a threshold; expected data conditions of the bearer and a user, which may be expected data buffer sizes of one or more bearers set up on the DU, and may be expected data buffer size conditions of one or more UEs connected to the DU, or an indication that expected data exceeds a threshold; a successfully transmitted data condition of the bearer, a data transmission delay including one or more of the following items: a data transmission delay of a CU-UP side, a data transmission delay of a DU side, a transmission delay of the F1-U interface, or one or more of the above items exceed a threshold; a data transmission delay condition of the bearer; an average number of retransmission times of an RLC; an indication that the maximum number of retransmission times of the RLC exceeds a threshold; the average number of retransmission times about an HARQ; an indication that the maximum number of retransmission times about the HARQ exceeds a threshold; a BLER or a BER of data transmission; an indication that the BLER or the BER exceeds a threshold; a throughput rate of the data transmission; and an indication that the throughput rate of the data transmission is lower than a threshold.

Optionally, the UP network element measures the data transmission quality, and performs a KPI statistic and/or an alarm operation according to the measured data transmission quality.

The present disclosure is described below in detail with reference to the preferred embodiments.

The contents of the present disclosure may be applied to a 5G NR or other equivalent systems. In all scenarios in which the CU-CP/CU-UP network elements are physically separated, data transmission and flow control states of the bearer are fed back to the CU-CP. The logic interface between the CU-CP/CU-UP is referred to as an E1 interface. The logic interface between the CU-UP and the DU is referred to as an F1-U interface. The logic interface between the CU-CP and the DU is referred to as an F1-C interface.

The present disclosure includes a measurement control manner. A CU-CP sends a transmission quality measurement control message to a CU-UP, and the CU-UP may measure and report according to the measurement control message. The CU-CP may carry the measurement control information in an E1 interface setup response message to send to the CU-UP, or the CU-CP carries the measurement control information in a bearer setup or modification message in a bearer setup or modification process to send to the CU-UP, or, the CU-CP sends an independent measurement control information message to the CU-UP.

The measurement control message:

The measurement control information includes one or more of the following information but is not limited to the following information: ID information of the CU-CP, which may be ID or IP address information of the CU-CP; ID information of a target CU-UP, which may be ID or IP address information of the CU-CP; indication information on a bearer flow control information reporting manner of the target CU-UP. Here, the reporting manner may be, but not limited to, the following several types, such as an indication as periodically reporting or an indication as reporting in an event trigger manner or an indication as intermediately reporting, and in case of the indication as periodically reporting, the reporting manner indication information further includes a reporting cycle, and in case of the indication as the event trigger manner, the reporting manner indication information further includes an event type, an event relevant threshold and other information; ID information of one or more UEs; and ID information of one or more bearers, which may be RB ID information.

Optionally, indication information of the reported content may be included, and the indication information may include one or more of the followings but is not limited thereto: indication information for indicating whether to measure or report bearer link quality information, where the bearer link quality information is link quality outage (fast fading of link quality) of one or more bearers, and link quality resume information (restoration of the link quality); indication information for indicating a link quality threshold for triggering bearer release or modification, which may be a frequency for occurring outage, or a maximum time interval within which resume is not received; indication information for indicating whether to measure or report a packet loss condition of the bearer on a transmission interface, where the packet loss condition is packet loss conditions of one or more bearers on an F1-U interface; indication information for indicating an F1-U interface packet loss threshold for triggering the bearer release or the bearer modification or F1 interface re-setup, where the packet loss threshold is the average maximum number of lost packets within a period of time; indication information for indicating whether to measure or report data expected conditions of the bearer and a user, where the data expected condition is a data buffer size expected by one or more bearers set up on the DU, and a data buffer size condition expected by one or more UEs connected to the DU; indication information for indicating an expected data threshold for triggering the bearer release or modification, where the expected data threshold is a maximum data volume threshold that can be provided by the UP for the bearer; indication information for indicating whether to measure or report a data condition transmitted successfully by the bearer, where the successfully transmitted data condition is a PDCP PDU SN successfully and continuously transmitted to a terminal at maximum by one or more bearers, or a PDCP PDU SN successfully sent to a bottom layer at maximum by one or more bearers; indication information for indicating whether to measure or report a data transmission delay condition of the bearer, where the data transmission delay includes at least one of the followings: a data transmission delay of a CU-UP side, a data transmission delay of a DU side, and a transmission delay of the F1-U interface; indication information for indicating a data transmission delay threshold for triggering the bearer release or modification, where the data transmission delay threshold is that the data transmission delay of the CU-UP side exceeds a specific threshold, or the data transmission delay of the DU side exceeds a specific threshold, or the transmission delay of the F1-U interface exceeds a specific threshold; indication information for indicating whether to measure or report the number of retransmission times of an RLC; indication information for indicating an RLC maximum retransmission number-of-times threshold for triggering the bearer release or modification; indication information for indicating whether to measure or report the average number of retransmission times about an HARQ; indication information for indicating the maximum number of HARQ retransmission times for triggering the bearer release or modification; indication information for indicating whether to measure or report a BLER or a BER of data transmission; indication information for indicating a maximum BLER or a maximum BER for triggering the bearer release or modification; indication information for indicating whether to measure or report a throughput rate of data transmission; indication information for indicating a throughput rate threshold for triggering the bearer release or modification, where the throughput rate threshold is configured to indicate throughput rates of one or more services of the UP cannot reach the threshold; and a measurement interval and a filter parameter corresponding to measurement of the above any item.

The present disclosure includes a measurement method of a CU-UP. The CU-UP may perform the following one or more measurements: link quality measurement, which may be a frequency for occurring outage, or a maximum time interval within which resume is not received; measurement on a packet loss condition on an F1-U transmission interface, where the packet loss condition is packet loss conditions of one or more bearers on the F1-U interface; measurement on expected data buffer sizes of the bearer and a user; measurement on a successfully transmitted data condition; measurement on a data transmission delay; measurement on the number of retransmission times of an RLC; measurement on the number of times about an HARQ; measurement on a BLER or a BER of data transmission; and measurement on a throughput rate of the data transmission.

The present disclosure includes measurement and reporting manners of a CU-UP. The CU-UP performs relevant data transmission quality measurement, and sends a measurement result to a CU-CP through a transmission feedback message. The transmission feedback message includes one or more of the following information, but is not limited to the following information: transmission feedback message: ID information of the CU-CP, which may be ID or IP address information of the CU-CP; ID information of a target CU-CP, which may be ID or IP address information of the CU-CP; ID information of one or more UEs; ID information of one or more bearers, which may be RB ID information; bearer link quality information, which may be a frequency for occurring outage, or a maximum time interval within which resume is not received, or an indication for occurrence of the outage, or an indication for link quality resume; a packet loss condition of the bearer on a transmission interface, which may be packet loss conditions of one or more bearers on an F1-U interface, or an indication that packet loss exceeds a threshold; expected data conditions of the bearer and a user, which may be an expected data buffer size expected by one or more bearers set up on a DU, and may be an expected data buffer size condition expected by one or more UEs connected to the DU, or an indication for expecting that data exceeds a threshold; a successfully transmitted data condition of the bearer; a data transmission delay condition of the bearer, which may include one or more of the followings: a data transmission delay of a CU-UP side, a data transmission delay of a DU side, a transmission delay of the F1-U interface, or an indication that the above one or more items exceed a threshold; the average number of retransmission times of an RLC, or an indication that the maximum number of retransmission times of the RLC exceeds a threshold; the average number of retransmission times about an HARQ, or an indication that the maximum number of retransmission times about the HARQ exceeds a threshold; a BLER or a BER of data transmission, or an indication that the BLER or the BER exceeds a threshold; and a throughput rate of the data transmission, or an indication that the throughput rate of the data transmission is lower than a threshold.

The present disclosure includes a bearer management method. A CP network element receives a data transmission feedback message sent by a UP network element, and performs a bearer management operation according to the data transmission feedback message.

The operation includes that: the CP network element determines, according to the data transmission feedback message, whether one or more bearers on the UP network element need to migrate to other UP network elements, and sends, if yes, a bearer release message or a bearer modification message to the UP network element to migrate a corresponding bearer service to the other UP network elements. The operation includes that: the CP network element determines, according to the data transmission feedback message, whether to release one or more bearers on the UP network element, and sends, if yes, a bearer release message or a bearer modification message to the UP network element to release a corresponding bearer service. The operation includes that: the CP network element determines, according to the data transmission feedback message, whether an F1 interface between the UP network element and a DU needs to be re-set up, and re-sets up, if yes, the F1 interface between the UP network element and the DU.

The present disclosure further includes another bearer management method. A UP network element receives a measurement control message sent by a CP network element, measures according to the measurement control message, and sends a bearer management message to the CP network element according to a measurement result. The bearer management message includes a cause value.

The operation includes that: the UP network element determines, according to the measurement result, whether one or more bearers on the UP network element need to migrate to other UP network elements, and sends, if yes, a bearer release request message or a bearer modification request message to the CP network element to notify the CP network element of executing a subsequent operation. The operation includes that: the UP network element determines, according to the measurement result, whether one or more bearers on the UP network element need to be released, and sends, if yes, a bearer release request message or a bearer modification request message to the CP network element to notify the CP network element of executing a subsequent operation.

The present disclosure further includes measurement and alarm methods. A CP network element receives a data transmission feedback message sent by a UP network element, and performs a KPI statistic and an alarm operation according to the data transmission feedback message; or the UP network element performs transmission quality measurement, and performs KPI statistic and alarm.

The present disclosure is further described below with reference to the specific embodiments.

Specific Embodiment 1

Figure 4:
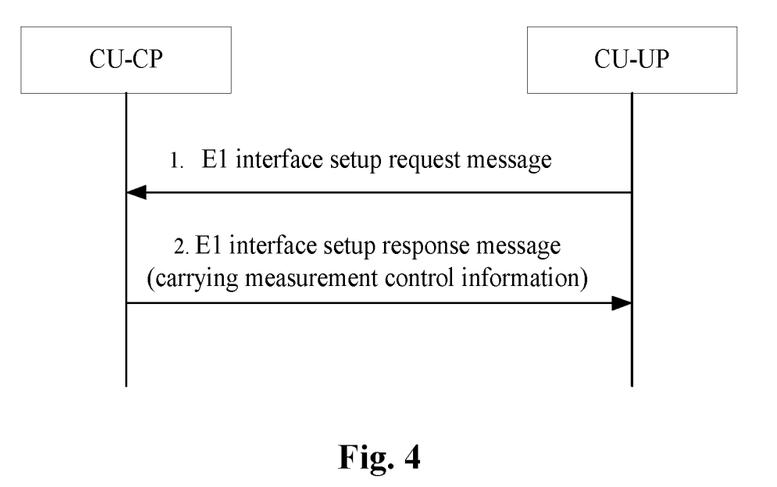
FIG. 4 is a schematic diagram illustrating that a CU-CP sends a measurement control message to a CU-UP in an E1 interface setup process according to the present disclosure.

FIG. 4 is a schematic diagram illustrating that a CU-CP sends a measurement control message to a CU-UP in an E1 interface setup process according to the present disclosure. As shown in FIG. 4, the diagram includes the following steps.

At Step 1: a CU-UP sends an E1 interface setup request message to a CU-CP.

At Step 2: the CU-CP carries measurement control information in an E1 setup response message to send to the CU-UP so as to indicate the CU-UP of performing measurement.

Specific Embodiment 2

Figure 5:
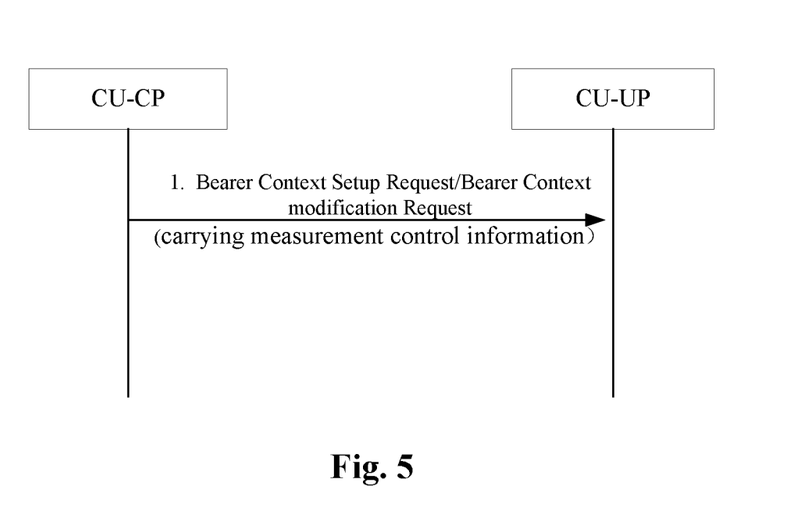
FIG. 5 is a schematic diagram illustrating that a CU-CP sends a measurement control message to a CU-UP in a bearer setup/modification process according to the present disclosure.

FIG. 5 is a schematic diagram illustrating that a CU-CP sends a measurement control message to a CU-UP in a bearer setup/modification process according to the present disclosure. As shown in FIG. 5, the diagram includes the following step.

At Step 1: a CU-UP sends a bearer context setup/context modification request message to a CU-CP, where measurement control information is carried, and configured to indicate the CU-UP of performing measurement.

Specific Embodiment 3

Figure 6:
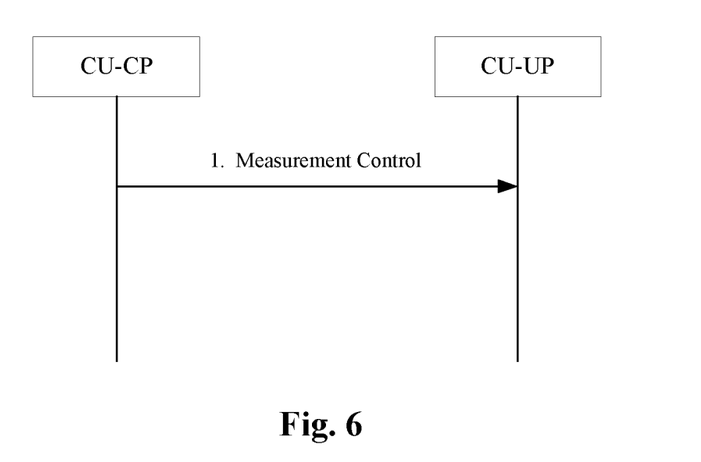
FIG. 6 is a schematic diagram illustrating that a CU-CP independently sends a measurement control message to a CU-UP according to the present disclosure.

FIG. 6 is a schematic diagram illustrating that a CU-CP independently sends a measurement control message to a CU-UP according to the present disclosure, which includes the following step.

At Step 1: a CU-UP sends an independent measurement control message to a CU-CP to indicate the CU-UP of performing measurement.

Specific Embodiment 4

Figure 7:
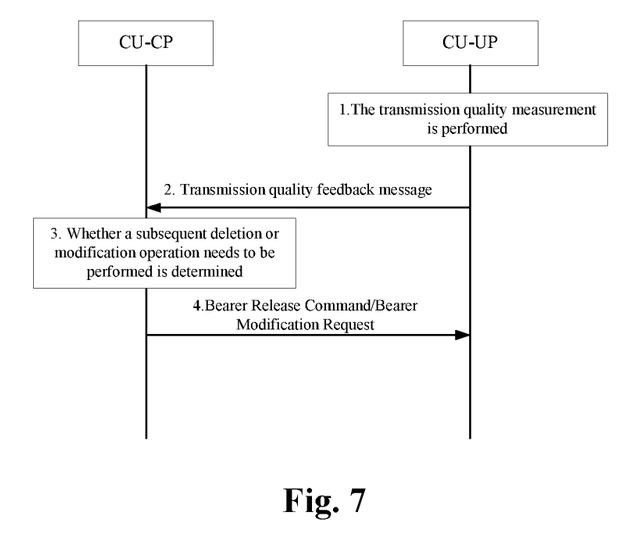
FIG. 7 is a schematic diagram illustrating that a CU-CP performs a bearer management operation according to a transmission feedback message sent by a CU-UP according to the present disclosure.

FIG. 7 is a schematic diagram illustrating that a CU-CP performs a bearer management operation according to a transmission feedback message sent by a CU-UP according to the present disclosure. As shown in FIG. 7, the diagram includes the following steps.

At Step 1: a CU-UP performs transmission quality measurement.

At Step 2: the CU-UP sends a transmission quality feedback message to a CU-CP.

At Step 3: the CU-CP determines, according to the transmission feedback message, whether one or more bearers on a UP network element need to migrate to other UP network elements, and whether to release one or more bearers on the UP network element.

At Step 4: the CU-CP sends a bearer release message or a bearer modification message to the CU-UP to migrate a corresponding bearer service to the other UP network elements, or sends the bearer release message or the bearer modification message to the UP network element to release the corresponding bearer service.

Specific Embodiment 5

Figure 8:
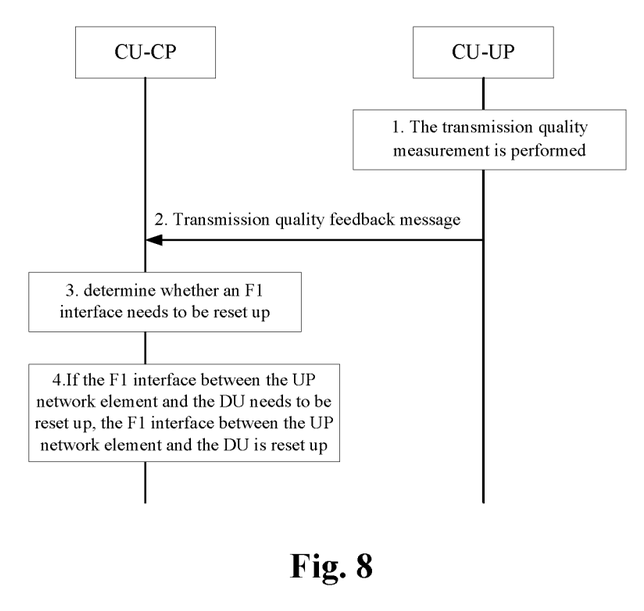
FIG. 8 is a schematic diagram illustrating that a CU-CP performs an F1 interface management operation according to a transmission feedback message sent by a CU-UP according to the present disclosure.

FIG. 8 is a schematic diagram illustrating that a CU-CP performs an F1 interface management operation according to a transmission feedback message sent by a CU-UP according to the present disclosure. As shown in FIG. 8, the diagram includes the following steps.

At Step 1: a CU-UP performs transmission quality measurement.

At Step 2: the CU-UP sends a transmission quality feedback message to a CU-CP.

At Step 3: the CU-CP determines, according to a transmission quality feedback message, whether to re-set up an F1 interface between a UP network element and a DU.

At Step 4: if determining that the F1 interface between the UP network element and the DU needs to be re-set up, the CU-CP re-sets up the F1 interface between the UP network element and the DU.

Specific Embodiment 6

Figure 9:
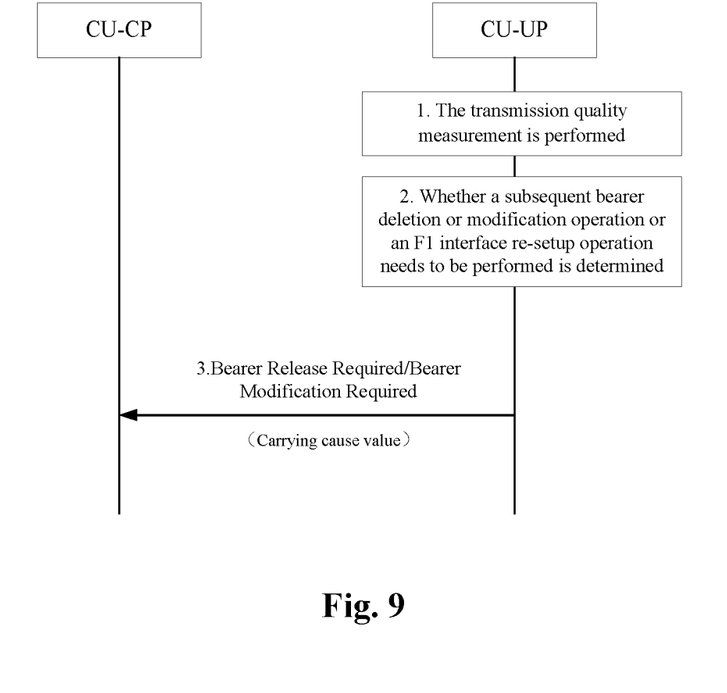
FIG. 9 is a schematic diagram illustrating that a CU-UP notifies a CU-CP of responding to a bearer management operation or an F1 interface management operation according to a transmission quality measurement according to the present disclosure.

FIG. 9 is a schematic diagram illustrating that a CU-UP notifies a CU-CP of responding to a bearer management operation or an F1 interface management operation according to a transmission quality measurement according to the present disclosure. As shown in FIG. 9, the diagram includes the following steps.

At Step 1: a CU-UP performs transmission quality measurement.

At Step 2: the CU-UP determines, according to the transmission quality measurement, whether one or more bearers on a UP network element need to migrate to other UP network elements, and whether to release one or more bearers on the UP network element.

At Step 3: the CU-UP sends a bearer release message or a bearer modification message to a CU-CP to request to migrate a corresponding bearer service to the other UP network elements, or sends the bearer release message or the bearer modification message to the UP network element to request to release the corresponding bearer service.

By means of the above-mentioned descriptions on the implementation manner, the person skilled in the art may clearly understand that the present disclosure may be implemented by software plus a necessary universal hardware platform, and may also be implemented by hardware certainly, but under most conditions, the former is a better implementation manner. Based on such an understanding, the technical solutions of the present disclosure substantially or parts making contributions to the conventional art may be embodied in form of software product, and the computer software product is stored in a storage medium (such as an ROM/RAM, a magnetic disk and an optical disc), including a plurality of instructions configured to enable a terminal device (which may be a mobile phone, a computer, a server, network equipment or the like) to execute the method in each embodiment of the present disclosure.

Embodiment 2

The embodiment further provides a transmission control device for implementing the above-mentioned embodiments and preferred implementation manners. A content that has been described will no longer be repeated. As used below, the term "module" may implement a combination of software and/or hardware having a predetermined function. Although the device described in the following embodiments is implemented by software preferably, the implementation of hardware or a combination of the software and the hardware may also be conceivable.

According to another embodiment of the present disclosure, a transmission control device is further provided, which may include: a first receiving module, configured to receive a data transmission feedback message and/or a bearer management message sent by a UP network element, where the bearer management message is determined by the UP network element according to data transmission quality between the UP network element and a DU, and the data transmission feedback message is configured to indicate data transmission states of the UP network element and the DU; and a first management module, configured to manage a bearer of the UP network element according to the data transmission feedback message and/or the bearer management message.

Optionally, before the CP network element receives the data transmission feedback message and/or the bearer management message sent by the UP network element, the CP network element sends measurement control information for indicating the UP network element of measuring the data transmission quality. It is to be noted that the CP network element may unnecessarily send the measurement control information to the UP network element, thereby triggering the UP network element to measure the data transmission quality.

Optionally, the measurement control information includes at least one of the followings: first measurement control information, configured to measure transmission quality of all service data for the DU; and second measurement control information, configured to measure transmission quality of service data of one or more terminals for a bearer of the UP network element. It is to be noted that the all service data may include uplink service data, and downlink service data.

Optionally, a manner that the CP network element sends the measurement control information includes one of the followings: the CP network element carries the measurement control information in a message in an E1 interface setup process. It is to be noted that the CP network element may carry the measurement control information in any message used in the E1 interface setup process. For example, the CP network element carries the measurement control information in an E1 interface setup request message, and carries the measurement control information in an E1 interface setup response message, but is not limited thereto. The CP network element carries the measurement control information in a message in a bearer setup or bearer modification process. It is to be noted that, same as the above embodiment, the CP network element may carry the measurement control information in any message in the bearer setup process, or the bearer modification process. For example, the CP network element may carry the measurement control information in a bearer setup request message, may carry the measurement control information in a bearer setup response message, and may carry the measurement control information in a bearer modification message but is not limited thereto. The CP network element sends independent measurement control information message to the UP network element.

Optionally, the measurement control information includes at least one of the followings: ID information of a CU-CP; ID information of a target CU-UP, which may be ID or IP address information of the CU UP; indication information for a bearer flow control information reporting manner of the target CU-UP, where the bearer flow control information reporting manner includes: periodically reporting bearer flow control information, reporting the bearer flow control information an event trigger manner, and reporting the bearer flow control information upon the reception of the indication information; ID information of one or more UEs; and ID information of one or more bearers, which may be RB ID information.

Optionally, the measurement control information includes at least one of the following indication information: indication information for indicating whether the UP network element measures or reports bearer link quality information, where the bearer link quality information is link quality outage (fast fading of link quality) of one or more bearers, and link quality resume information (restoration of the link quality); indication information for indicating a link quality threshold for triggering bearer release or bearer modification, where the link quality threshold includes one of the followings: a frequency for occurring outage, or a maximum time interval within which resume is not received; indication information for indicating whether to measure or report a packet loss condition of the bearer on a transmission interface, where the packet loss condition includes packet loss conditions of one or more bearers on an F1-U interface; indication information for indicating an F1-U interface packet loss threshold for executing one of the following operations: bearer release trigger, the bearer modification, and F1 interface re-setup, and the packet loss threshold including the average maximum number of lost packets within a period of time; indication information for indicating whether to measure or report an expected data condition of the bearer and an expected data condition of a user, where the expected data condition includes a data buffer size expected by one or more bearers set up on the DU, or, a data buffer size condition expected by one or more UEs connected to the DU; indication information for indicating an expected data threshold for triggering bearer release or modification, where the expected data threshold includes a maximum data volume threshold that can be provided by the UP for the bearer; indication information for indicating whether to measure or report a data condition transmitted successfully by the bearer, where the successfully transmitted data condition includes a PDCP PDU SN successfully and continuously transmitted to a terminal at maximum by one or more bearers, or a PDCP PDU SN successfully sent to a bottom layer at maximum by one or more bearers; indication information for indicating whether to measure or report a data transmission delay condition of the bearer, where the data transmission delay includes at least one of the followings: a data transmission delay of a CU-UP side, a data transmission delay of a DU side, and a transmission delay of the F1-U interface; indication information for indicating a data transmission delay threshold for triggering the bearer release or the bearer modification, where the data transmission delay threshold includes: the data transmission delay of the CU-UP side exceeds a specific threshold, or the data transmission delay of the DU side exceeds a specific threshold, or the transmission delay of the F1-U interface exceeds a specific threshold; indication information for indicating whether to measure or report the number of retransmission times of an RLC; indication information for indicating an RLC maximum retransmission number-of-times threshold for triggering the bearer release or the bearer modification; indication information for indicating whether to measure or report the average number of retransmission times about an HARQ; indication information for indicating the maximum number of HARQ retransmission times for triggering the bearer release or modification; indication information for indicating whether to measure or report a BLER or a BER of data transmission; indication information for indicating a maximum BLER or a maximum BER for triggering the bearer release or the bearer modification; indication information for indicating whether to measure or report a throughput rate of data transmission between the UP network element and the DU; and indication information for indicating a throughput rate threshold for triggering the bearer release or modification, where the throughput rate threshold is configured to indicate throughput rates of one or more services of the UP cannot reach the threshold.

Optionally, the measurement control message may further include a measurement interval and/or a filter parameter corresponding to the measurement of the above any item.

Optionally, the operation that the CP network element receives the data transmission feedback message sent by the UP network element, and performs the bearer management operation according to the data transmission feedback message includes one of the followings: in a case where the CP network element determines, according to the data transmission feedback message, that one or more bearers on the UP network element need to migrate to other UP network elements, the CP network element sends a bearer release message or a bearer modification message to the UP network element to indicate that the UP network element is to migrate one or more bearer services to other UP network elements, and it is to be noted that the bearer service may be a service running on the bearer; in a case where the CP network element determines, according to the data transmission feedback message, to release one or more bearers on the UP network element, the CP network element sends a bearer release message or a bearer modification message to the UP network element to indicate that the UP network element is to release one or more service services; and in a case where the CP network element determines, according to the data transmission feedback message, that an F1 interface between the UP network element and the DU needs to be re-set up, the CP network element indicates the UP network element of re-setting up the F1 interface.

Optionally, after the CP network element receives the data transmission feedback message sent by the UP network element, the CP network element performs a KPI statistic and/or an alarm operation according to the data transmission feedback message.

According to another embodiment of the present disclosure, a transmission control device is further provided, which may include: a first sending module, configured to send a data transmission feedback message and/or a bearer management message to a CP network element, where the bearer management message is determined by a UP network element according to data transmission quality of transmission data between the UP network element and a DU, and the data transmission feedback message is configured to indicate a data transmission state of the transmission data between the UP network element and the DU; a second receiving module, configured to receive operation information fed back by the CP network element according to the data transmission feedback message and/or the bearer management message; and a first control module, configured to control a data bearer between the UP network element and the DU according to the operation information.

Optionally, before the UP network element sends the data transmission feedback message and/or the bearer management message to the CP network element, measurement control information sent by the CP network element for indicating the UP network element of measuring the data transmission quality is received.

Optionally, after the measurement control information sent by the CP network element for indicating the UP network element of measuring the data transmission quality is received, the UP network element performs at least one of the following measurement operations: measurement on link quality, which may be a frequency occurring outage, or a maximum time interval within which resume is not received; measurement on a packet loss condition on an F1-U transmission interface, where the packet loss condition is packet loss conditions of one or more bearers on an F1-U interface; measurement on expected data condition buffer size of the bearer and an expected data condition buffer size of a user; measurement on a successfully transmitted data condition; measurement on a data transmission delay; measurement on the number of retransmission times of an RLC; measurement on the number of times about an HARQ; measurement on a BLER or a BER of data transmission; and measurement on a throughput rate of the data transmission.

Optionally, after the measurement control information sent by the CP network element for indicating the UP network element of measuring the data transmission quality is received, the UP network element measures the data transmission quality according to the measurement control message, and sends a bearer management message to the CP network element according to a measurement result, where the bearer management message includes a cause value.

Optionally, after the UP network element measures the data transmission quality according to the measurement control message, the method further includes at least one of the followings: in a case where the UP network element determines, according to the measurement result, that one or more bearers on the UP network element need to migrate to other UP network elements, the UP network element sends a bearer management message for requesting bearer release or bearer modification to the CP network element; and in a case where the UP network element determines, according to the measurement result, that one or more bearers on the UP network element need to be released, the UP network element sends the bearer management message for requesting the bearer release or the bearer modification to the CP network element.

Optionally, the data transmission feedback message includes at least one of the followings: ID information of a CU-CP, which may be ID or IP address information of the CU-CP; ID information of a target CU-CP, which may be ID or IP address information of the CU-CP; ID information of one or more UEs; ID information of one or more bearers, which may be RB ID information; bearer link quality information, which may be a frequency occurring outage, or a maximum time interval with which resume is not received, or an indication for occurrence of outage, or a link quality resume indication; a packet loss condition of the bearer on a transmission interface, which may be packet loss conditions of one or more bearers on an F1-U interface, or an indication that the packet loss exceeds a threshold; expected data conditions of the bearer and a user, which may be expected data buffer sizes of one or more bearers set up on the DU, and may be expected data buffer size conditions of one or more UEs connected to the DU, or an indication that expected data exceeds a threshold; a successfully transmitted data condition of the bearer, a data transmission delay including one or more of the following items: a data transmission delay of a CU-UP side, a data transmission delay of a DU side, a transmission delay of the F1-U interface, or one or more of the above items exceed a threshold; a data transmission delay condition of the bearer; an average number of retransmission times of an RLC; an indication that the maximum number of retransmission times of the RLC exceeds a threshold; the average number of retransmission times about an HARQ; an indication that the maximum number of retransmission times about the HARQ exceeds a threshold; a BLER or a BER of data transmission; an indication that the BLER or the BER exceeds a threshold; a throughput rate of the data transmission; and an indication that the throughput rate of the data transmission is lower than a threshold.

Optionally, the UP network element measures the data transmission quality, and performs a KPI statistic and/or an alarm operation according to the measured data transmission quality.

It is to be noted that each module may be implemented by software or hardware. The later may be implemented via the following manner, but is not limited thereto: the above modules are located in the same processor; or the above modules are respectively located in different processors in any combined form.

Embodiment 3

According to another embodiment of the present disclosure, a storage medium is further provided; the storage medium stores a computer program; and the computer program is configured to execute, when running, the method of the above any embodiment.

Embodiment 4

According to another embodiment of the present disclosure, an electronic device is further provided, which includes a memory and a processor; the memory stores a computer program; and the processor is configured to run the computer program to execute the method of the above any embodiment.

Obviously, those skilled in the art should understand that the above-mentioned steps of the disclosure may be implemented by a general-purpose computing device, and they may be centralized on a single computing device or distributed on a network composed of multiple computing devices.

Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple steps therein are made into a single integrated circuit module for implementation. By doing so, the present disclosure is not limited to any specific combination of hardware and software.

The above are only preferred embodiments of the present disclosure and should not be used for limiting the present disclosure. For the person skilled in the art, the present disclosure may have various modifications and changes. Any modifications, equivalent replacements, improvements and the like within the spirit and principle of the present disclosure shall fall within the scope of protection of the present disclosure.

What is claimed is:

1. A transmission control method, comprising:
    receiving, by a Control Plane (CP) network element, a data transmission feedback message and/or a bearer management message sent by a User Plane (UP) network element, wherein the bearer management message is determined by the UP network element according to data transmission quality between the UP network element and a Distributed Unit (DU), and the data transmission feedback message is configured to indicate data transmission states of the UP network element and the DU; and
    managing a bearer of the UP network element according to the data transmission feedback message and/or the bearer management message;
    wherein before receiving, by the CP network element, the data transmission feedback message and/or the bearer management message sent by the UP network element, sending, by the CP network element, measurement control information for indicating the UP network element of measuring the data transmission quality;
    wherein after receiving the measurement control information sent by the CP network element for indicating the UP network element of measuring the data transmission quality, measuring, by the UP network element, the data transmission quality according to a measurement control message, sending the bearer management message to the CP network element according to a measurement result, the bearer management message comprising a cause value.

2. The method as claimed in claim 1, wherein the measurement control information comprises at least one of followings:
    first measurement control information, configured to measure transmission quality of all service data for the DU; and
    second measurement control information, configured to measure transmission quality of service data of one or more terminals for a bearer of the UP network element.

3. The method as claimed in claim 1, wherein a manner that the CP network element sends the measurement control information comprises one of followings:
    the CP network element carries the measurement control information in a message in an E1 interface setup process, wherein the E1 interface is a logical interface between the CP network element and the UP network element;
    the CP network element carries the measurement control information in a message in a bearer setup or bearer modification process; and
    the CP network element sends an independent measurement control information message to the UP network element.

4. The method as claimed in claim 1, wherein the measurement control information comprises at least one of followings:
    Identifier (ID) information of a Central Unit (CU)-CP;
    ID information of a target CU-UP;
    indication information for a bearer flow control information reporting manner of the target CU-UP, the bearer flow control information reporting manner comprising: periodically reporting bearer flow control information, reporting the bearer flow control information in an event trigger manner, and reporting the bearer flow control information upon reception of the indication information;
    ID information of one or more User Equipments (UEs); and
    ID information of one or more bearers.

5. The method as claimed in claim 1, wherein the measurement control information comprises at least one of following indication information:
    indication information for indicating whether the UP network element measures or reports bearer link quality information;
    indication information for indicating a link quality threshold for triggering bearer release or bearer modification;
    indication information for indicating whether to measure or report a packet loss condition of the bearer on a transmission interface;
    indication information for indicating an F1-U interface packet loss threshold for executing one of following operations: bearer release trigger, the bearer modification, and F1 interface between the UP network element and the DU re-setup, wherein the F1-U interface is a logical interface between the CU-UP and the DU;
    indication information for indicating whether to measure or report an expected data condition of the bearer and an expected data condition of a user;
    indication information for indicating an expected data threshold for triggering the bearer release or modification;
    indication information for indicating whether to measure or report a data condition transmitted successfully by the bearer;
    indication information for indicating whether to measure or report a data transmission delay condition of the bearer;
    indication information for indicating a data transmission delay threshold for triggering the bearer release or the bearer modification;
    indication information for indicating whether to measure or report the number of retransmission times of a Radio Link Control (RLC);
    indication information for indicating an RLC maximum retransmission number-of-times threshold for triggering the bearer release or the bearer modification;
    indication information for indicating whether to measure or report an average number of retransmission times about a Hybrid Automatic Repeat Request (HARQ);
    indication information for indicating a maximum number of HARQ retransmission times for triggering the bearer release or modification;

indication information for indicating whether to measure or report a Block Error Ratio (BLER) or a Bit Error Rate (BER) of data transmission;

indication information for indicating a maximum BLER or a maximum BER for triggering the bearer release or the bearer modification;

indication information for indicating whether to measure or report a throughput rate of data transmission between the UP network element and the DU; and indication information for indicating a throughput rate threshold for triggering the bearer release or modification.

6. The method as claimed in claim 1, wherein the operation that the CP network element receives the data transmission feedback message sent by the UP network element and performs the bearer management operation according to the data transmission feedback message, comprises one of followings:

in a case where the CP network element determines, according to the data transmission feedback message, that one or more bearers on the UP network element need to migrate to other UP network elements, sending, by the CP network element, a bearer release message or a bearer modification message to the UP network element to indicate that the UP network element is to migrate one or more bearer services to other UP network elements;

in a case where the CP network element determines, according to the data transmission feedback message, to release one or more bearers on the UP network element, sending, by the CP network element, a bearer release message or a bearer modification message to the UP network element to indicate that the UP network element is to release one or more service services; and in a case where the CP network element determines, according to the data transmission feedback message, that an F1 interface between the UP network element and the DU needs to be re-set up, indicating, by the CP network element, the UP network element of re-setting up the F1 interface.

7. The method as claimed in claim 1, further comprising: after receiving, by the CP network element, the data transmission feedback message sent by the UP network element, performing, by the CP network element, a Key Performance Indicator (KPI) statistic and/or an alarm operation according to the data transmission feedback message.

8. A transmission control method, comprising:

sending, by a User Plane (UP) network element, a data transmission feedback message and/or a bearer management message to a Control Plane (CP) network element, wherein the bearer management message is determined by the UP network element according to data transmission quality of transmission data between the UP network element and a Distributed Unit (DU), and the data transmission feedback message is configured to indicate a data transmission state of the transmission data between the UP network element and the DU;

receiving operation information fed back by the CP network element according to the data transmission feedback message and/or the bearer management message; and controlling a data bearer between the UP network element and the DU according to the operation information;

wherein before sending, by the UP network element, the data transmission feedback message and/or the bearer management message to the CP network element, receiving measurement control information sent by the CP network element for indicating the UP network element of measuring the data transmission quality;

wherein after receiving the measurement control information sent by the CP network element for indicating the UP network element of measuring the data transmission quality, measuring, by the UP network element, the data transmission quality according to a measurement control message, sending the bearer management message to the CP network element according to a measurement result, the bearer management message comprising a cause value.

9. The method as claimed in claim 8, wherein after receiving the measurement control information sent by the CP network element for indicating the UP network element of measuring the data transmission quality, the UP network element performs at least one of following measurement operations:

measurement on link quality;

measurement on a packet loss condition on an F1-U transmission interface, wherein the F1-U transmission interface is a logic interface between the CU-UP and the DU;

measurement on an expected data condition buffer size of the bearer, and an expected data condition buffer size of a user;

measurement on a successfully transmitted data condition;

measurement on a data transmission delay;

measurement on the number of retransmission times of a Radio Link Control (RLC);

measurement on the number of times about a Hybrid Automatic Repeat Request (HARD);

measurement on a Block Error Rate (BLER) or a Bit Error Rate (BER) of data transmission; and measurement on a throughput rate of the data transmission.

10. The method as claimed in claim 8, further comprising, after measuring, by the UP network element, the data transmission quality according to the measurement control message, at least one of followings:

in a case where the UP network element determines, according to the measurement result, that one or more bearers on the UP network element need to migrate to other UP network elements, sending a bearer management message for requesting bearer release or bearer modification to the CP network element; and in a case where the UP network element determines, according to the measurement result, that one or more bearers on the UP network element need to be released, sending the bearer management message for requesting the bearer release or the bearer modification to the CP network element.

11. The method as claimed in claim 8, wherein the data transmission feedback message comprises at least one of followings:

Identifier (ID) information of a Centralized Unit (CU)-CP;

ID information of a target CU-UP;

ID information of one or more User Equipments (UEs);

ID information of one or more bearers;

bearer link quality information;

a packet loss condition of the bearer on a transmission interface;

expected data conditions of the bearer and a user;
a successfully transmitted data condition of the bearer;
a data transmission delay condition of the bearer;
an average number of retransmission times of an RLC;
an indication that an RLC maximum retransmission number-of-times threshold exceeds a threshold;
an average number of retransmission times about an HARQ;
an indication that a maximum number of retransmission times about the HARQ exceeds a threshold;
a BLER or a BER of data transmission;
an indication that the BLER or the BER exceeds a threshold;
a throughput rate of the data transmission; and
an indication that the throughput rate of the data transmission is lower than a threshold.

12. The method as claimed in claim 8, further comprising:
measuring, by the UP network element, the data transmission quality, and performing a Key Performance Indicator (KPI) statistic and/or an alarm operation according to the measured data transmission quality.

13. A transmission control device, comprising:
a receiving module, configured to receive a data transmission feedback message and/or a bearer management message sent by a User Plane (UP) network element, wherein the bearer management message is determined by the UP network element according to data transmission quality between the UP network element and a Distributed Unit (DU), and the data transmission feedback message is configured to indicate data transmission states of the UP network element and the DU; and
a management module, configured to manage a bearer of the UP network element according to the data transmission feedback message and/or the bearer management message;
wherein before receiving the data transmission feedback message and/or the bearer management message sent by the UP network element, the transmission control device is further configured to:
send measurement control information for indicating the UP network element of measuring the data transmission quality;
after the UP network element measuring the data transmission quality according to the measurement control message and sending the bearer management message according to a measurement result, the transmission control device is further configured to receive the bearer management message, wherein the bearer management message comprising a cause value.

14. A non-volatile storage medium, storing a computer program, wherein the computer program is configured to execute, when running, the method of claim 1.

15. An electronic device, comprising a memory and a processor, wherein the memory stores a computer program, and the processor is configured to run the computer program to execute the method of claim 1.

16. An electronic device, comprising a memory and a processor, wherein the memory stores a computer program, and the processor is configured to run the computer program to execute the method of claim 2.

* * * * *